US008792823B2

(12) United States Patent
Liu et al.

(10) Patent No.: US 8,792,823 B2
(45) Date of Patent: Jul. 29, 2014

(54) APPROACH FOR QUALITY OF SERVICE CONTROL ON UN-WANTED SERVICES (E.G. VOICE OVER INTERNET PROTOCOL OR MULTIMEDIA) OVER WIRELINE AND WIRELESS IP NETWORK

(75) Inventors: Chung-Zin Liu, Naperville, IL (US); Thomas Trayer Towle, Naperville, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 61 days.

(21) Appl. No.: 12/928,900

(22) Filed: Dec. 22, 2010

(65) Prior Publication Data
US 2011/0090849 A1  Apr. 21, 2011

Related U.S. Application Data

(63) Continuation of application No. 11/585,695, filed on Oct. 24, 2006, now abandoned.

(51) Int. Cl.
*H04B 1/06* (2006.01)

(52) U.S. Cl.
USPC ............................. 455/26.1; 370/388; 726/2

(58) Field of Classification Search
USPC ............. 370/338, 395.21; 455/26.1; 726/2, 3
See application file for complete search history.

(56) References Cited

U.S. PATENT DOCUMENTS

| 7,143,435 | B1* | 11/2006 | Droms et al. | 726/3 |
| 8,301,703 | B2* | 10/2012 | Boss et al. | 709/206 |
| 2002/0160811 | A1* | 10/2002 | Jannette et al. | 455/560 |
| 2003/0115376 | A1* | 6/2003 | Drobychev et al. | 709/328 |
| 2005/0232191 | A1* | 10/2005 | Wills | 370/328 |
| 2005/0286540 | A1* | 12/2005 | Hurtta et al. | 370/401 |
| 2006/0212395 | A1* | 9/2006 | Winklevoss et al. | 705/50 |
| 2007/0116234 | A1* | 5/2007 | Schneider et al. | 379/219 |
| 2007/0130327 | A1* | 6/2007 | Kuo et al. | 709/224 |
| 2007/0147244 | A1* | 6/2007 | Rasanen | 370/231 |
| 2007/0150722 | A1* | 6/2007 | Aaron et al. | 713/155 |
| 2007/0271220 | A1* | 11/2007 | Carter | 707/2 |
| 2008/0175223 | A1* | 7/2008 | Croak et al. | 370/352 |
| 2008/0250484 | A1* | 10/2008 | Chong et al. | 726/7 |
| 2010/0017865 | A1* | 1/2010 | Leahy et al. | 726/7 |

* cited by examiner

*Primary Examiner* — Mahendra Patel
*Assistant Examiner* — Edd Rianne Plata
(74) *Attorney, Agent, or Firm* — Carmen Patti Law Group, LLC (57) ABSTRACT

An apparatus in one example has: at least one access network operatively coupled to an access and data network; and a controller in the access and packet data network, the controller determining access of data flow from the access network through the access and data network. Embodiments allow access or packet data service providers to control which types of services are allowed over their respective access and packet data networks.

10 Claims, 12 Drawing Sheets

APPROACH FOR QUALITY OF SERVICE CONTROL ON UN-WANTED SERVICES (E.G. VOICE OVER INTERNET PROTOCOL OR MULTIMEDIA) OVER WIRELINE AND WIRELESS IP NETWORK

CROSS-REFERENCE TO RELATED APPLICATIONS

This application is a continuation application of U.S. patent application Ser. No. 11/585,695, filed Oct. 24, 2006, entitled "APPROACH FOR QoS CONTROL ON UNWANTED SERVICES (e.g. VoIP OR MULTIMEDIA) OVER WIRELESS AND WIRELESS IP NETWORK."

TECHNICAL FIELD

The invention relates generally to telecommunication systems and, more specifically, to a system that provides for QoS control on un-wanted services (e.g. VoIP or Multimedia) over wireline and wireless and wireless IP network.

BACKGROUND

Quality of Service (QoS) refers to the capability of a network to provide better service to selected network traffic over various technologies, including Frame Relay, Asynchronous Transfer Mode (ATM), Ethernet and 802.1 networks, SONET, and IP-routed networks that may use any or all of these underlying technologies. The primary goal of QoS is to provide priority including dedicated bandwidth, controlled jitter and latency (required by some real-time and interactive traffic), and improved loss characteristics. Also important is making sure that providing priority for one or more flows does not make other flows fail. QoS technologies provide the elemental building blocks that will be used for future business applications in campus, WAN, and service provider networks.

A flow can be defined in a number of ways. One common way refers to a combination of source and destination addresses, source and destination socket numbers, and the session identifier. It can also be defined more broadly as any packet from a certain application or from an incoming interface. Recent identification tools have allowed the definition of a flow to be performed more precisely (for instance, to the URL or MIME type inside an HTTP packet).

Since wireline and wireless access and packet data services independently run over IP networks, any type of service, including services owned by other service providers, are allowed over any respective access and packet data network. A provider of the respective access and packet data network thus has little or no control over QoS (Quality of Service) or charging functions for services that flow over the respective access and packet data network.

Thus, there is a need in the art for a system that provides for QoS Control on un-wanted services (e.g. VoIP or Multimedia) over Wireline and Wireless IP network.

SUMMARY

One embodiment of the present method and apparatus encompasses an apparatus. This embodiment of the apparatus may comprise: at least one access network operatively coupled to an access and data network; and a controller in the access and packet data network, the controller determining access of data flow from the access network through the access and data network.

Another embodiment of the present method and apparatus encompasses a method. This embodiment of the method may comprise: identifying an access network operatively coupled to an access and packet data network; and one of allowing or denying a flow of packet data based on the identification of the access network.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Since wireline and wireless access and packet data services independently run over IP networks, without any type of control by a service provider, services owned by other service providers, are allowed over access and packet data networks. Embodiments according to the present method and apparatus allow access or packet data service providers to control which types of services are allowed over their respective access and packet data network.

Figure 1:
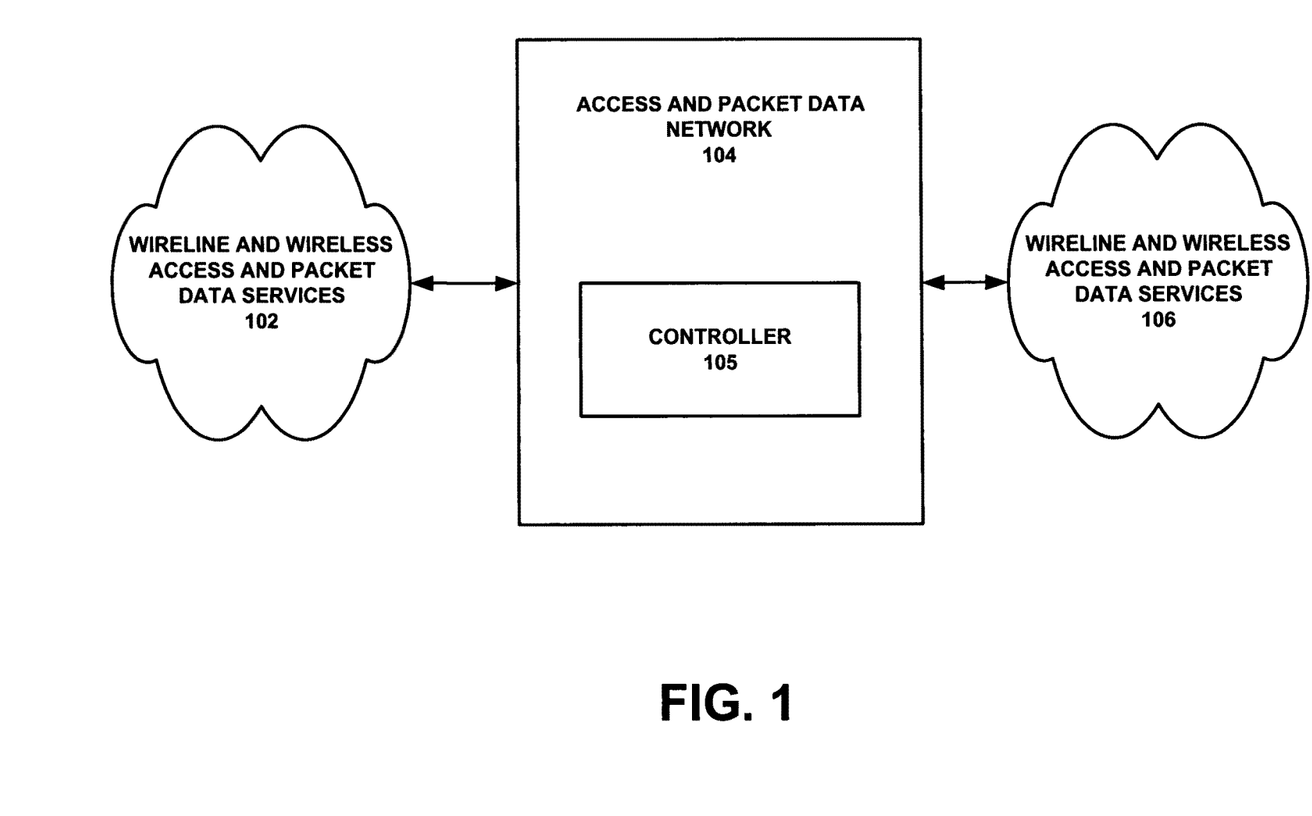
FIG. 1 is a general block diagram of a network for use with the present method and apparatus.

FIG. 1 is a representation of one implementation of a system in which access or packet data service providers have control over the types of services are allowed over their access and packet data network 104. In general a plurality of wireline and wireless access and packet data services, such as 102 and 106, may be operatively coupled to the access and packet data network 104. The access and packet data network 104 may have a controller 105 that provides for QoS control on un-wanted services over the access and packet data network 104.

Figure 2:
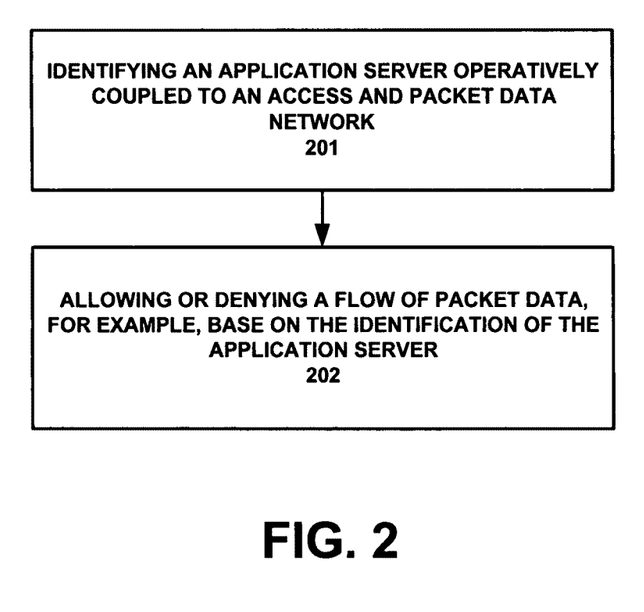
FIG. 2 is a general block diagram of an embodiment of the present method.

FIG. 2 is a general block diagram of an embodiment of the present method. This embodiment may have the steps of: identifying an application server operatively coupled to an access and packet data network (201); and allowing or denying a flow of packet data, for example, based on the identification of the application server (202).

In the embodiments of the present method and apparatus as described below, MPLS (Multiprotocol Label Switching) is a type of network management protocol in which incoming packets are assigned, or encapsulated with, labels, and are then forwarded through the network based on the contents of the labels. Labels may be added to, swapped, or removed, as the packets move between routers. MPLS gives network operators a great deal of flexibility to divert and route traffic, whether around congestion or bottlenecks, or to take advantage of underutilized links.

UDP (User Datagram Protocol) is a communications protocol that offers a limited amount of service when messages are exchanged between computers in a network that uses the Internet Protocol (IP). UDP is an alternative to the Transmission Control Protocol (TCP) and, together with IP, is sometimes referred to as IP address/UDP. Like the Transmission Control Protocol, UDP uses the Internet Protocol to actually get a data unit (called a datagram) from one computer to another. Unlike TCP, however, UDP does not provide the service of dividing a message into packets (datagrams) and reassembling it at the other end. Specifically, UDP doesn't provide sequencing of the packets that the data arrives in. This means that the application program that uses UDP must be able to make sure that the entire message has arrived and is in the right order. Network applications that want to save processing time because they have very small data units to exchange (and therefore very little message reassembling to do) may prefer UDP to TCP.

UDP provides two services not provided by the IP layer. It provides port numbers to help distinguish different user requests and, optionally, a checksum capability to verify that the data arrived intact.

A gateway is an entity that operates above the link layer and translates, when required, the interface and protocol used by one network into those used by another distinct network. An AGW (access gateway) is a gateway that is treated like a network interface in that it is expected to exchange routing information. Typically, if it does not do so for a period of time, the route associated with the gateway is deleted.

An access network is a network that connects directly to the end user or customer. Access networks connect to the "backbone," which is a network made up of high-speed lines between major switching points.

It is to be understood that embodiments of the present apparatus and method may encompass numerous other types of networks, gateways, communication protocols, etc.

Figure 3:
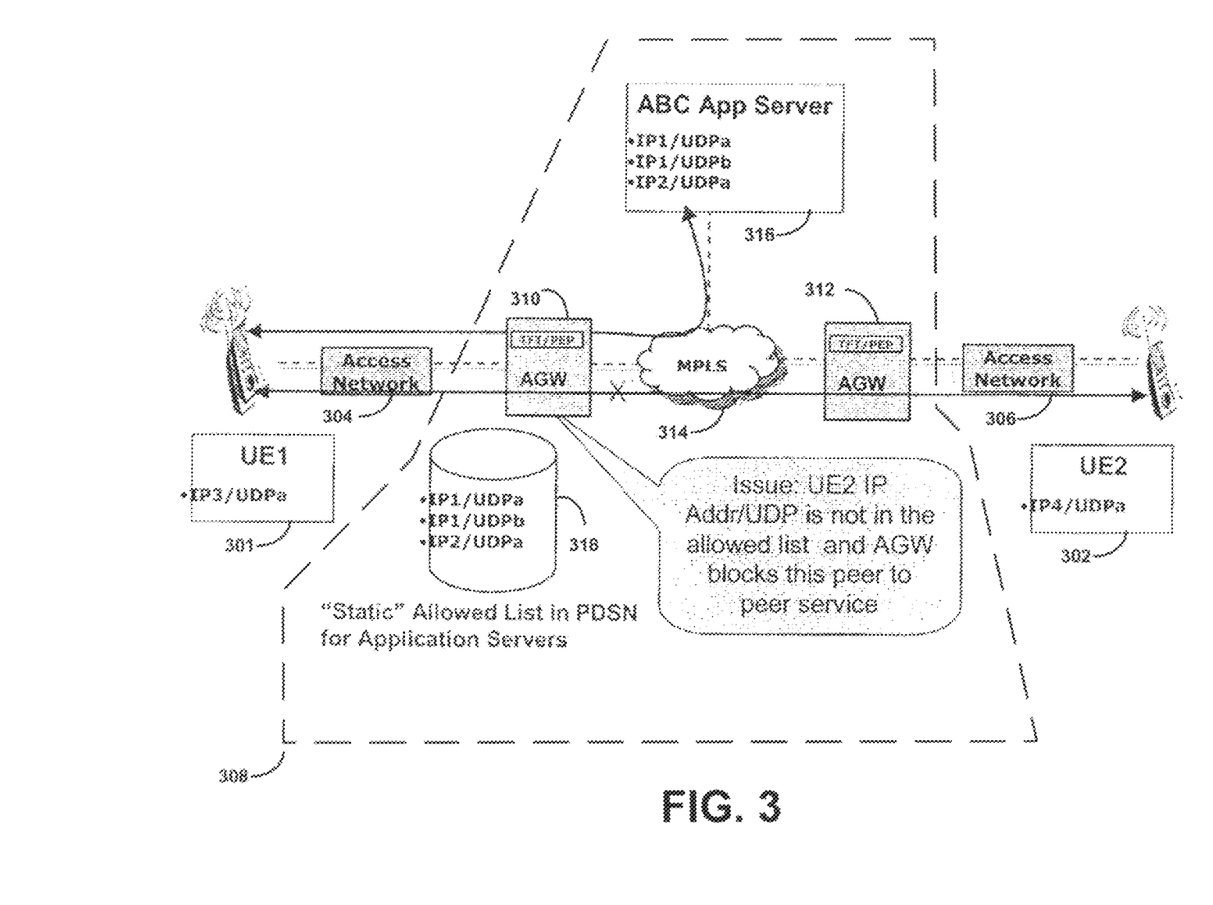
FIG. 3 depicts one embodiment according to the present apparatus.
Figure 4:
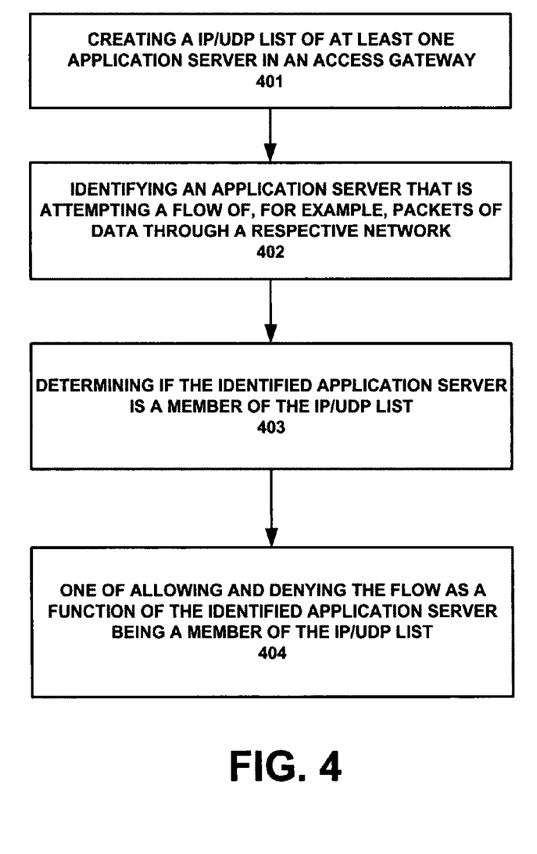
FIG. 4 depicts one embodiment according to the present method.

As depicted in the FIG. 3 apparatus and the FIG. 4 method, a Static Allowed list may be provisioned in Access Gateway to block the application server in the address list. Addresses of allowed application servers may be provisioned in the allowed list. Once it is determined that a requested application is not provisioned in the access gateway, the AGW notifies the Access network and the UE to release the resource. Some drawbacks of this approach are listed as below:

Mobile to Mobile flows do not provide useful policy criteria to determine if an application should be approved or not, that is no useful information in the IP address, and/or UDP ports are dynamic;

Cannot support Service Controlled QoS and Charging from service layer (e.g. Flow Based Charging);

Complicated Operation, such as Difficult to provision and update policies in PDSN compared to centralized PDF; and Less Flexibility, such as Application Service Providers needs to coordinate with Access Service providers.

In this embodiment, depicted in FIG. 3, UE1 (user equipment) 301 and UE2 302 are operatively coupled by access networks 304 and 306, respectively, to access and packet data network 308. The access and packet data network 308 may have AGW 310 and AGW 312 operatively coupled to a MPLS 314. The AGW 310 and AGW 312 may also be operatively coupled, respectively, to access network 304 and access network 306.

An ABC application server 316 may be operatively coupled to the MPLS 314 and may utilized database 318 that has a "static" allowed list in PDSN (packet data service node) for the application server 316.

The FIG. 4 method, for use in the FIG. 3 embodiment, may have the following steps: creating a IP/UDP list of at least one application server in an access gateway (401); identifying an application server that is attempting a flow of, for example, packets of data through a respective network (402); determining if the identified application server is a member of the IP/UDP list (403); one of allowing and denying the flow as a function of the identified application server being a member of the IP/UDP list (404). The IP/UDP list may contain allowed application servers in which case the flow is allowed, or the IP/UDP list may contain non-allowed application servers in which case the flow is denied.

Figure 5:
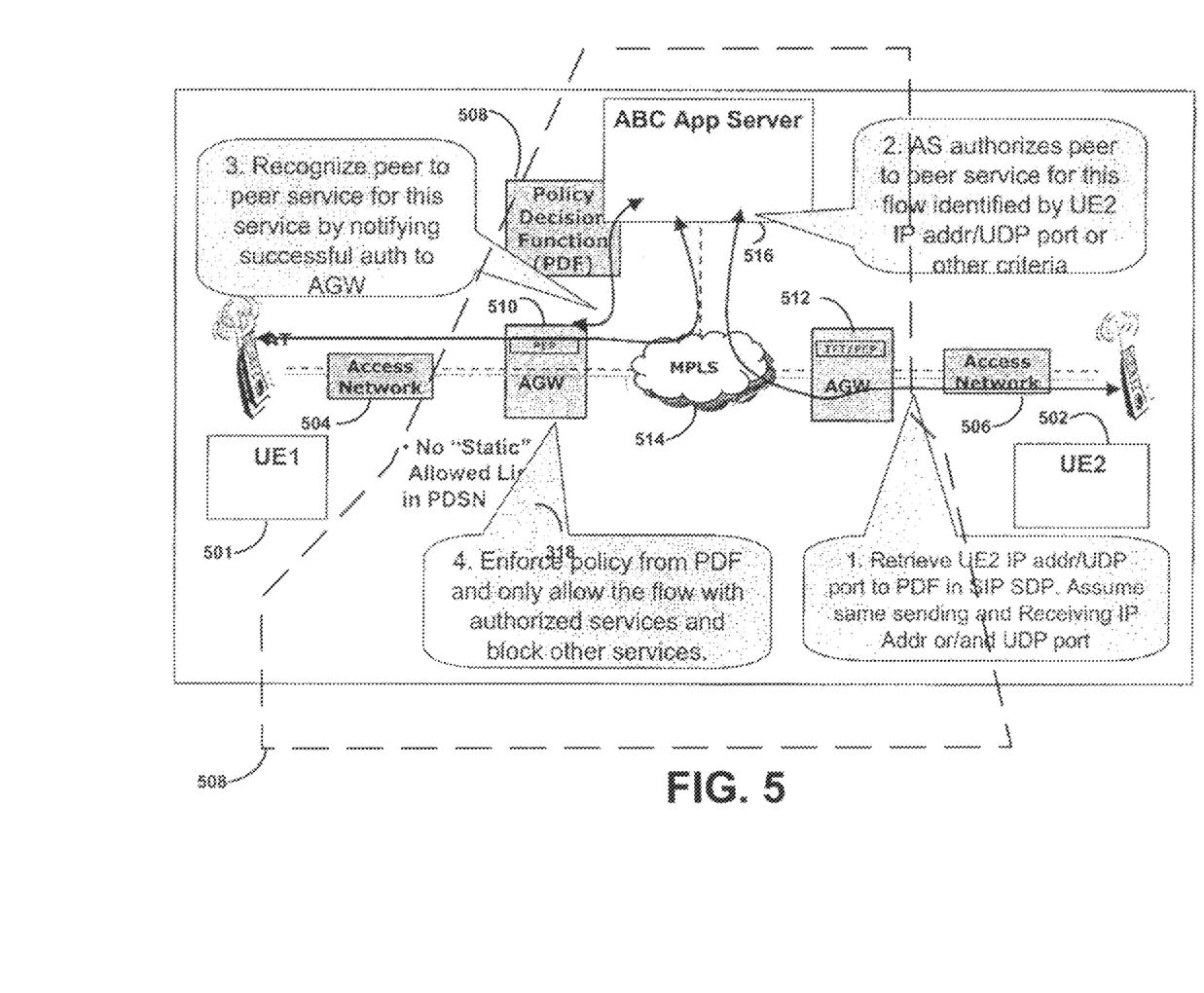
FIG. 5 depicts another embodiment according to the present apparatus.
Figure 6:
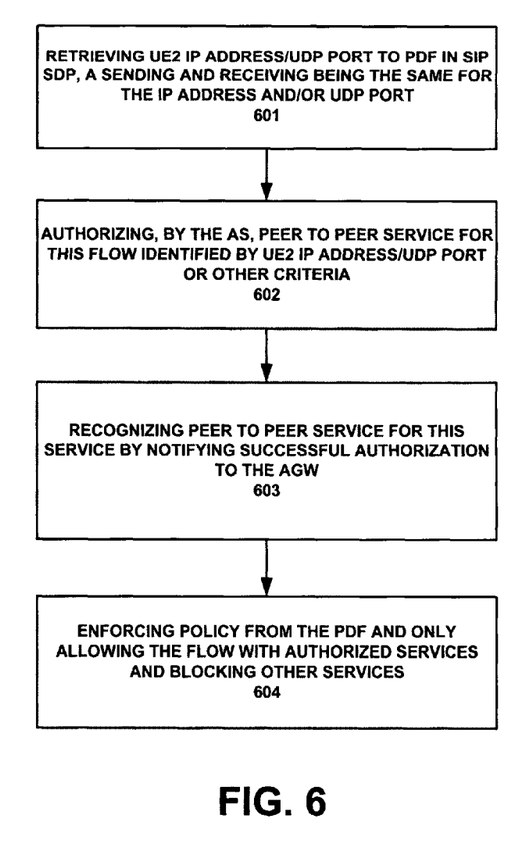
FIG. 6 depicts another embodiment according to the present method.

The FIG. 5 apparatus and the FIG. 6 method depict an embodiment for Dynamic Session Control with Restricted policy in AGW.

In this embodiment, depicted in FIG. 5, UE1 501 and UE2 502 are operatively coupled by access networks 504 and 506, respectively, to access and packet data network 508. The access and packet data network 508 may have AGW 510 and AGW 512 operatively coupled to a MPLS 514. The AGW 510 and AGW 512 may also be operatively coupled, respectively, to access network 504 and access network 506.

An ABC application server 516 may be operatively coupled to the MPLS 514 and may utilized a policy decision function (PDF) 518.

Session Control with Policy Decision Function (PDF) authorizes QoS to AGW. The default policy implemented in AGW may be "Block all services until authorization from session". The AS (Application Server) in session layer may authorize this service with UE2 IP/UDP address or other criteria.

The FIG. 6 method, for use in the FIG. 5 embodiment, may have the following steps: Retrieving UE2 IP address/UDP port to PDF in SIP SDP, assuming same sending and receiving IP address and/or UDP port (601); Authorizing, by the AS, peer to peer service for this flow identified by UE2 IP address/UDP port or other criteria (602); Recognizing peer to peer service for this service by notifying successful authorization to the AGW (603); and Enforcing policy from the PDF and only allowing the flow with authorized services and blocking other services (604).

Figure 7:
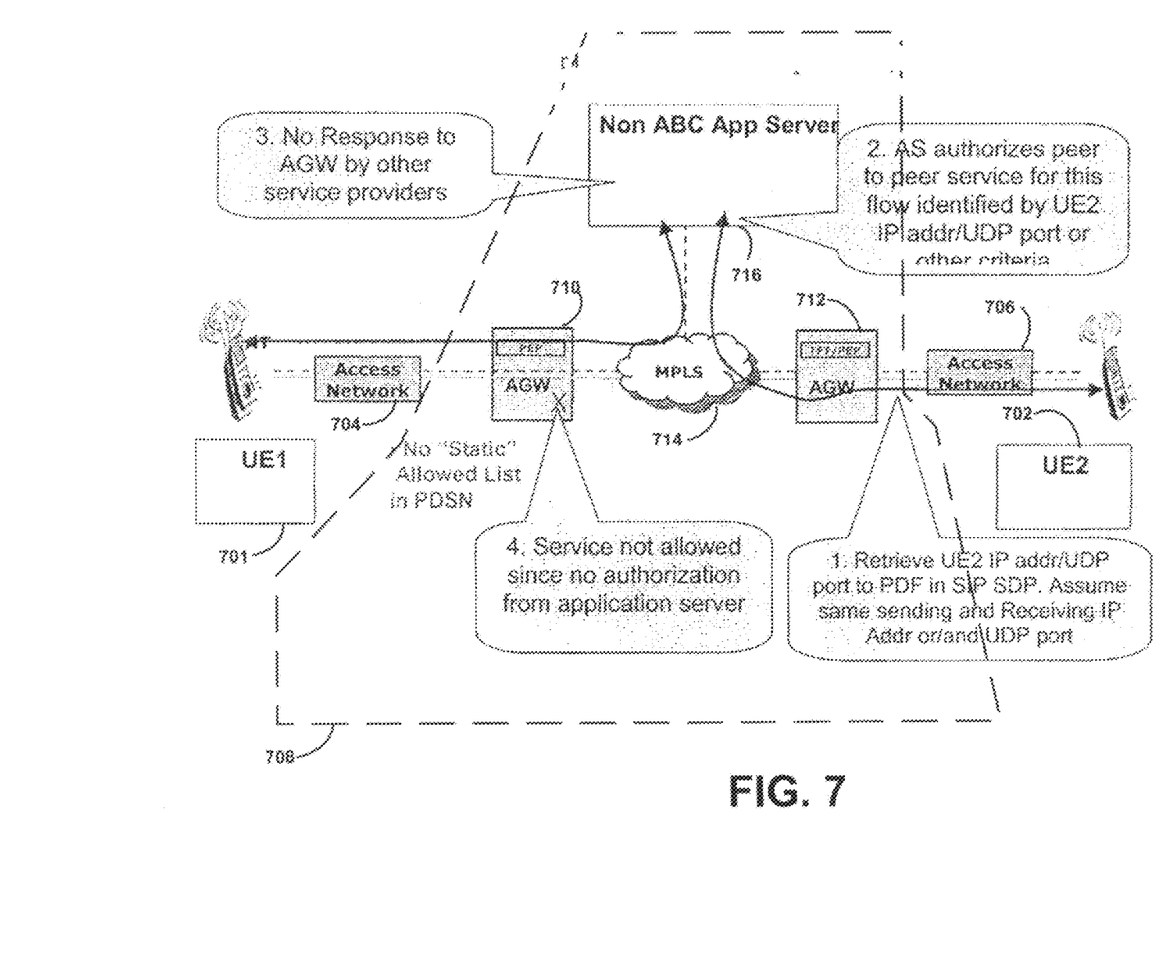
FIG. 7 depicts yet another embodiment according to the present apparatus.
Figure 8:
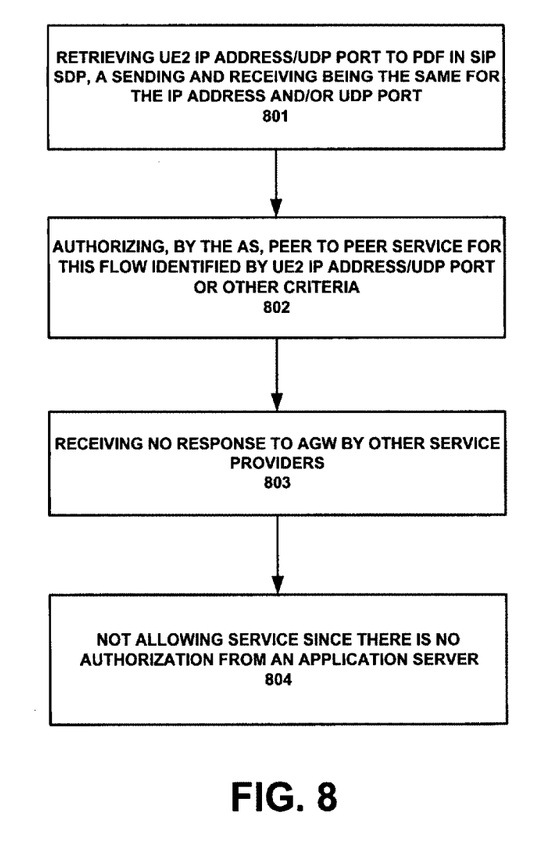
FIG. 8 depicts yet another embodiment according to the present method.

The FIG. 7 apparatus and the FIG. 8 method depict an embodiment, when authorization is not applied for unauthorized service providers, then the AGW will block these flows as defined in a default policy.

In this embodiment, depicted in FIG. 7, UE1 701 and UE2 702 are operatively coupled by access networks 704 and 706, respectively, to access and packet data network 708. The access and packet data network 708 may have AGW 710 and AGW 712 operatively coupled to a MPLS 714. The AGW 710 and AGW 712 may also be operatively coupled, respectively, to access network 704 and access network 706.

A non-ABC application server 716 may be operatively coupled to the MPLS 714.

The FIG. 8 method, for use in the FIG. 7 embodiment, may have the following steps: Retrieving UE2 IP address/UDP port to PDF in SIP SDP, assuming same sending and receiving IP address and/or UDP port (801); Authorizing, by the AS, peer to peer service for this flow identified by UE2 IP address/UDP port or other criteria (802); Receiving no response to AGW by other service providers (803); and Not allowing service since there is no authorization from an application server (804).

Figure 9:
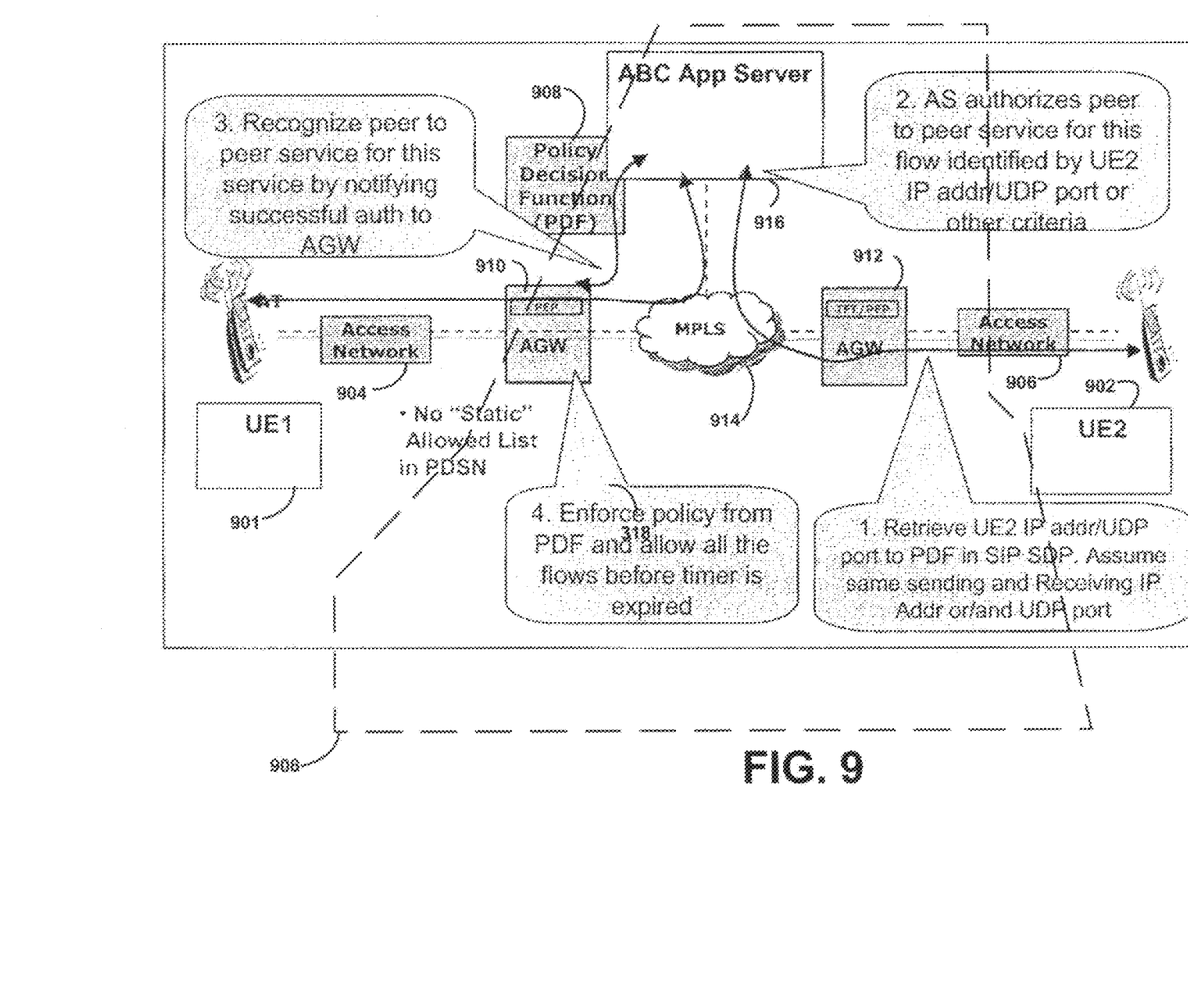
FIG. 9 depicts a further embodiment according to the present apparatus.
Figure 10:
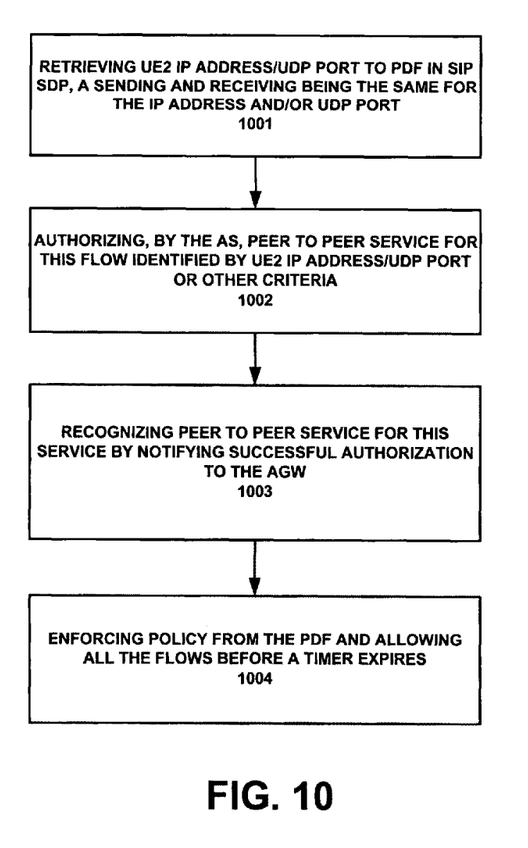
FIG. 10 depicts a further embodiment according to the present method.

The FIG. 9 apparatus and the FIG. 10 method depict an embodiment for Dynamic Session Control with an enhanced timer in the AGW.

In this embodiment, depicted in FIG. 9, UE1 901 and UE2 902 are operatively coupled by access networks 904 and 906, respectively, to access and packet data network 908. The access and packet data network 908 may have AGW 910 and AGW 912 operatively coupled to a MPLS 914. The AGW 910 and AGW 912 may also be operatively coupled, respectively, to access network 904 and access network 906.

An ABC application server 916 may be operatively coupled to the MPLS 914 and may utilized a policy decision function (PDF) 918.

This approach supports a more open policy, that is "all services are allowed". However, a policy authorization timer is invoked for all services. For authorization, a response is expected from an Application Server and PDF owned by agreed or authorized service providers.

The FIG. 10 method, for use in the FIG. 9 embodiment, may have the following steps: Retrieving UE2 IP address/UDP port to PDF in SIP SDP, assuming same sending and receiving IP address and/or UDP port (1001); Authorizing, by the AS, peer to peer service for this flow identified by UE2 IP address/UDP port or other criteria (1002); Recognizing peer to peer service for this service by notifying successful authorization to the AGW (1003); Enforcing policy from the PDF and allowing all the flows before a timer expires (1004).

Figure 11:
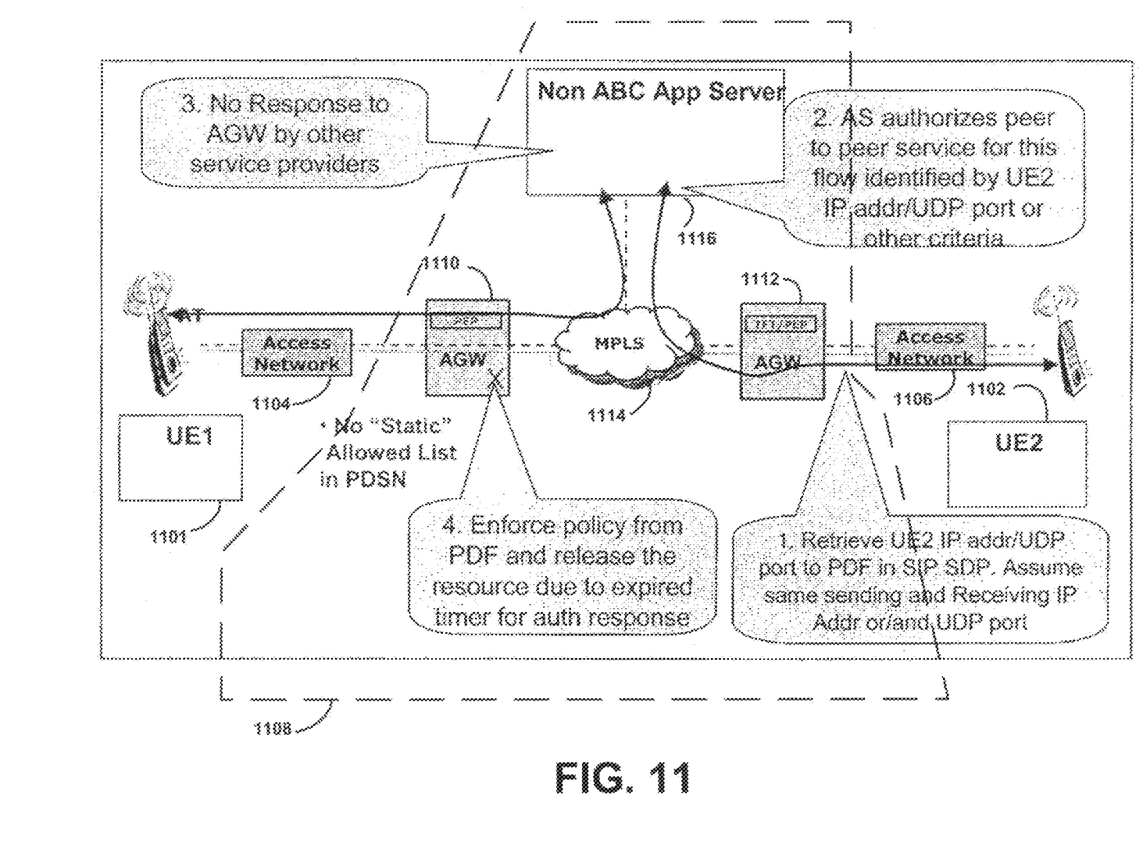
FIG. 11 depicts a another further embodiment according to the present apparatus.
Figure 12:
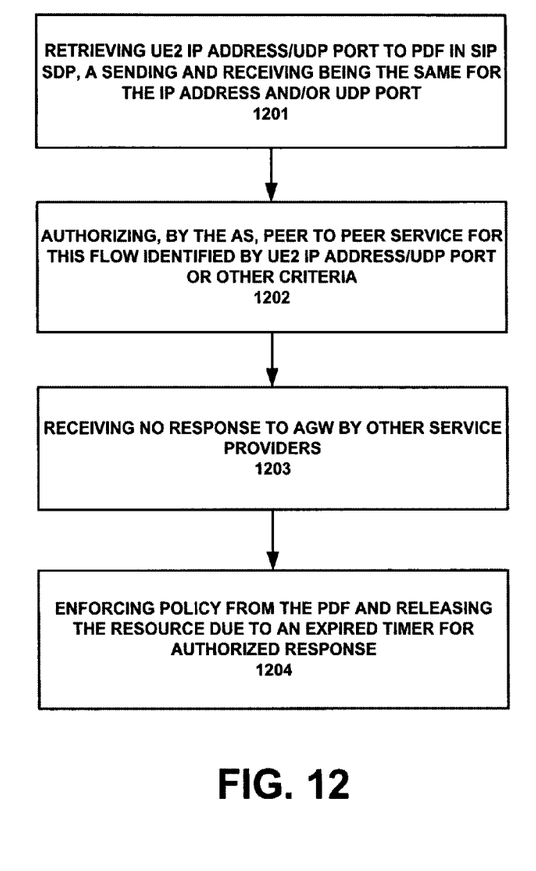
FIG. 12 depicts a another further embodiment according to the present method.

The FIG. 11 apparatus and the FIG. 12 method depict an embodiment wherein, if service is provided by unauthorized service providers, the policy timer will be expired and the resource will be release after timeout.

In this embodiment, depicted in FIG. 11, UE1 1101 and UE2 1102 are operatively coupled by access networks 1104 and 1106, respectively, to access and packet data network 1108. The access and packet data network 1108 may have AGW 1110 and AGW 1112 operatively coupled to a MPLS 1114. The AGW 1110 and AGW 1112 may also be operatively coupled, respectively, to access network 1104 and access network 1106.

A non-ABC application server 1116 may be operatively coupled to the MPLS 1114 and may utilized a policy decision function (PDF) 1118.

The FIG. 12 method, for use in the FIG. 11 embodiment, may have the following steps: Retrieving UE2 IP address/UDP port to PDF in SIP SDP, assuming same sending and receiving IP address and/or UDP port (1201); Authorizing, by the AS, peer to peer service for this flow identified by UE2 IP address/UDP port or other criteria (1202); Receiving no response to AGW by other service providers (1203): and Enforcing policy from the PDF and releasing the resource due to an expired timer for authorized response (1204).

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. An apparatus for providing control of selectively allowed applications in an access and packet data network, comprising:
   at least one access network operatively coupled to the access and packet data network;
   an Internet Protocol/User Datagram Protocol (IP/UDP) list of application servers that are operatively coupled to the access and packet data network;
   an application server in a session layer in the access and packet data network operatively connected to the IP/UDP list of application servers, the application server employing dynamic control functions to employ policies for determining access of data flow from the access network through the access and packet data network for applications allowed through the at least one access network based on the application servers in the IP/UDP list of application servers;
   at least one user equipment operatively coupled to a multiprotocol label switching network;
   an access gateway operatively coupled between an access network and the multiprotocol label switching network; and
   at least one IP/UDP application server operatively coupled to the multiprotocol label switching network that utilizes a database that has a static allowed list in a PDSN (packet data service node) for the application server,
   wherein the static allowed list is provisioned in the access gateway to block flows from the access network,
   wherein the apparatus further comprises a default policy implemented in the access gateway that blocks all services until authorized, and
   wherein all authorized services are allowed until occurrence of a timeout, and wherein the apparatus further comprises a policy authorization timer for all services.

2. The apparatus according to claim 1, wherein a plurality of access networks are operatively coupled to the access and packet data network.

3. The apparatus according to claim 1, wherein addresses of allowed application servers are provisioned in the allowed list.

4. The apparatus according to claim 3, wherein, once it is determined that a requested application is not provisioned in the access gateway, the access gateway notifies the access network and the respective user equipment releases a respective resource.

5. The apparatus according to claim 1, wherein a plurality of access networks are operatively coupled to the multiprotocol label switching network via respective access gateways.

6. The apparatus according to claim 1, wherein the apparatus further comprises:
   at least one user equipment operatively coupled to an access network;

an access gateway operatively coupled between the access network and a multiprotocol label switching network; and at least one application server operatively coupled to the multiprotocol label switching network that authorizes peer to peer service for a flow identified by a predetermined criteria between the user equipment and the application server.

7. The apparatus according to claim 6, wherein the multiprotocol label switching network authorizes peer to peer service for a flow identified by user equipment IP/UDP port.

8. An apparatus for providing control of selectively allowed applications in an access and packet data network, comprising:

at least one access network operatively coupled to the access and packet data network;
an Internet Protocol/User Datagram Protocol (IP/UDP) list of application servers that are operatively coupled to the access and packet data network;
an application server in a session layer in the access and packet data network operatively connected to the IP/UDP list of application servers, the application server employing dynamic control functions to employ policies for determining access of data flow from the access network through the access and packet data network for applications allowed through the at least one access network based on the application servers in the IP/UDP list of application servers,
at least one user equipment operatively coupled to the access network;
an active access gateway operatively coupled between the access network and a multiprotocol label switching network; and
the application server operatively coupled to the multiprotocol label switching network that utilizes a policy decision function for communication between the user equipment and the application server,
wherein a session control with the policy decision function authorizes a quality of service to the access gateway,
wherein the apparatus further comprises a default policy implemented in the access gateway that blocks all services until authorized, and
wherein all authorized services are allowed until occurrence of a timeout, and wherein the apparatus further comprises a policy authorization timer for all services.

9. A method, comprising:

retrieving a first user equipment Internet Protocol (IP address/User Datagram Protocol (UDP) port to a policy decision function of an application server in a session layer within an access and packet data network, assuming at least one of a same sending and receiving IP address and a same sending and receiving UDP port;
authorizing peer to peer service for this flow identified by a predetermined criteria;
recognizing peer to peer service for this service by notifying successful authorization from the access and packet data network to an access gateway;
contacting the application server within the access and data packet network to determine a policy for the service based on an IP/UDP list of application servers operatively connected to the application server;
dynamically enforcing the policy from the policy decision function of the application server based on a response from an application server and allowing all flows before a timer expires, and
provisioning a static allowed list to block a flow of packet data, the static allowed list being the IP/UDP list of application servers,
implementing a default policy in the access gateway that blocks all services until authorized; and
allowing all authorized services until a policy authorization timer for all services indicates the occurrence of a timeout.

10. The method according to claim 9, wherein the predetermined criteria comprises a second user equipment IP address/UDP port.

* * * * *